US006907492B2

(12) United States Patent
Matsuda et al.

(10) Patent No.: US 6,907,492 B2
(45) Date of Patent: Jun. 14, 2005

(54) INTERFACE CIRCUIT WHICH MEETS UNIVERSAL SERIAL BUS STANDARD AND PERFORMS HOST AND DEVICE FUNCTIONS

(75) Inventors: Chikara Matsuda, Nara (JP); Takefumi Isaka, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 541 days.

(21) Appl. No.: 10/107,065

(22) Filed: Mar. 28, 2002

(65) Prior Publication Data

US 2003/0023804 A1 Jan. 30, 2003

(30) Foreign Application Priority Data

Jul. 27, 2001 (JP) ........................................ 2001-228441

(51) Int. Cl.[7] ........................ G06F 13/20; G06F 13/14; G06F 13/00
(52) U.S. Cl. ........................ 710/313; 710/110; 710/305
(58) Field of Search ................................ 710/313, 305, 710/110; 713/340

(56) References Cited

U.S. PATENT DOCUMENTS

| | | | | |
|---|---|---|---|---|
| 5,784,581 A | * | 7/1998 | Hannah | 710/110 |
| 6,105,097 A | * | 8/2000 | Larky et al. | 710/314 |
| 6,549,958 B1 | * | 4/2003 | Kuba | 710/14 |
| 6,753,903 B1 | * | 6/2004 | Lin | 348/207.2 |
| 6,769,035 B1 | * | 7/2004 | Garreau | 710/14 |
| 6,774,935 B1 | * | 8/2004 | Morimoto et al. | 348/211.5 |
| 2004/0019732 A1 | * | 1/2004 | Overtoom et al. | 710/313 |

FOREIGN PATENT DOCUMENTS

JP 10-301898 11/1998

OTHER PUBLICATIONS

English Language Translation of Japanese Patent Application Publication Number 10–301898.*
"Philips chip gives USB a new potential"—Electronic Buyers News—Jul. 17, 2000.*
ISP1161 Full–speed Universal Serial Bus single–chip host and device—Rev.01—Jul. 3, 2001.*

* cited by examiner

Primary Examiner—Mark H. Rinehart
Assistant Examiner—Jeremy S. Cerullo
(74) Attorney, Agent, or Firm—Rabin & Berdo, P.C.

(57) ABSTRACT

When a device such as a printer is connected to a connector 49 via a USB cable using an electronic device 40 as a host, a selecting circuit 43b is switched to a host function circuit 43a by operating a switch 42. When a host such as a personal computer is connected to the connector 49 via the USB cable using the electronic device 40 as device, the selecting circuit 43b is switched to a device function circuit 44a by operating the switch 42. A USB interface is controlled according to output of a microcomputer 41. Therefore, an interface circuit which meets USB standards, facilitates switching between a host function and a device function, has a simple circuit configuration and allows small-sizing can be provided.

27 Claims, 4 Drawing Sheets

F I G. 2
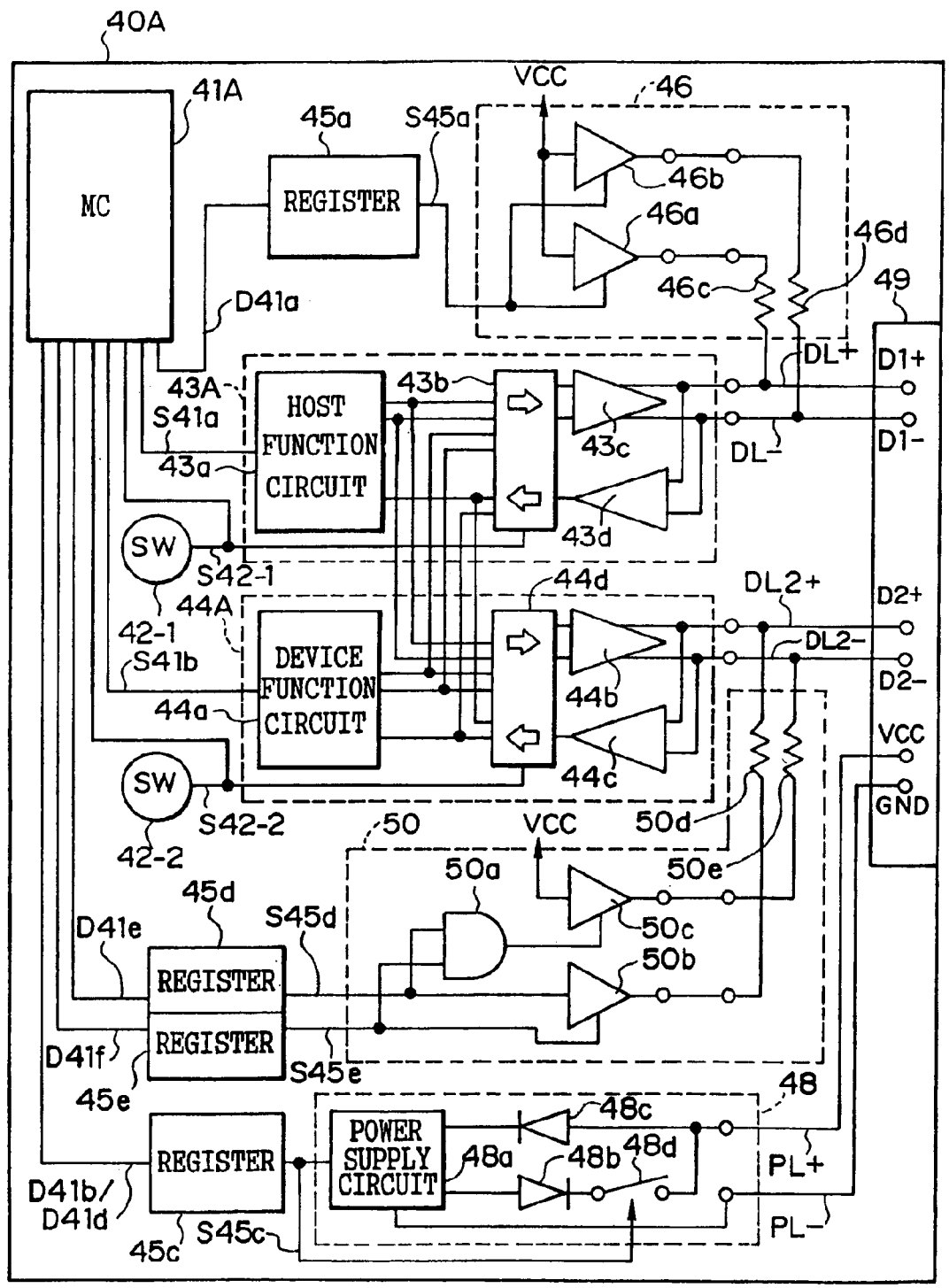

INTERFACE CIRCUIT WHICH MEETS UNIVERSAL SERIAL BUS STANDARD AND PERFORMS HOST AND DEVICE FUNCTIONS

BACKGROUND OF THE INVENTION

1. Field of the Invention

The present invention relates to an interface circuit which is provided in an electronic device such as a digital camera and which meets USB (Universal Serial Bus) standard for connection to a host such as a personal computer (hereinafter, referred to as a "PC") or a printer, for example.

2. Description of the Related Art

The USB standard is used for connection of a device such as a keyboard, a mouse, a printer or the like to a host such as a PC. The USB interface allows interfaces which are different for each device to be connected to a host such as a PC via the same connector. The USB interface is classified as having either a host function for controlling signal transmission/reception actively or a device function for playing a passive role.

FIGS. 3A and 3B are configuration diagrams showing examples of connections of hosts and devices, which are provided with interface circuits of a conventional USB standard. There are one USB interface for each device and one USB interface for each host.

In FIG. 3A, for example, an electronic equipment such as a digital camera or the like is caused to function as a device 10 and a host 20, such as a PC or the like is connected to the device via a USB cable 30. A controller for the USB interface is provided on a side of the host 20.

In FIG. 3B, for example, an electronic device such as a digital camera or the like. is caused to function as a host 10A and a device 20A such as a printer or the like is connected to the host 10A via a USB cable 30. A controller for the USB interface is provided on a side of the host 10A.

In FIG. 3A, the device 10 which is the electronic device is provided with a transceiver section 11 for performing transmission/reception of data. The transceiver section is connected to data terminals D+ and D− of a USB connector 15 via data lines DL+ and DL− for USB signal transmission. When the device 10 is intended for high speed data transfer, the data line DL+ is connected to a power source terminal VCC via a pull-up resistor 12. When the device 10 is intended for a low speed data transfer, the data line DL− is connected to the power source terminal VCC via a pull-up resistor 13 in place of the pull-up resistor 12. Also, a power supply section 14 is provided in the device 10 to receive source power supplied from the host 20 side via the cable 30. The source power received by the power supply section 14 is supplied to an internal circuit in the device 10. The power supply section 14 is connected to a power source terminal VCC of the connector 15 and a power source terminal GND on a ground side via power source lines PL+ and PL−. The connector 15 is connected to the host 20 such as a PC or the like via the cable 30.

Provided in a main body of the host 20 such as a PC is a transceiver section 21 for performing transmission/reception of data. The transceiver section 21 is connected to data terminals D+ and D− of a USB connector 25 via data lines DL+ and DL−. The data lines DL+ and DL− are connected to the power source terminal GND on the ground side via pull-down resistors 22 and 23. Also, provided in the main body of the host 20 is a power supply section 24 for supplying source power to the device 10. The power supply section 24 is connected to the power source terminals VCC and GND of a connector 25 via power source lines PL+ and PL−. For example, a mouse 26-1 for signal input, a keyboard 26-2 for signal input, a printer 26-3 for output and the like are connected to the main body of the host 20.

In the configuration shown in FIG. 3A, for example, when data of an image photographed by the device 10 side or the like is fed to the host 20, power supplied from the power supply section 24 on the host 20 side is received in the power supply section 14 of the device 10 via the cable 30. The internal circuit in the device 10 operates on the basis of the power received, the image data or the like is output from the transceiver section 11, and it is transmitted to the transceiver 21 on the host 20 side via the cable 30, so that the image data or the like is displayed on a display on the host 20 side. Alternatively, the image data or the like may be printed by the printer 26-3.

On the contrary, in the configuration shown in FIG. 3B, for example, the electronic device is caused to function as the host 10A and the printer or the like is caused to function as the device 20A. The host 10A is provided with a transceiver section 11 for performing transmission/reception of data, or transmitting and receiving data, a power supply section 14A for supplying source power to the device 20A, and the like. The transceiver section 11 is connected to data terminals D+ and D− of the connector via data lines DL+ and DL−. The data lines DL+ and DL− are connected to a power source terminal GND on the ground side via pull-down terminals D+ and D−. The power supply section 14A is connected to a power source terminal VCC of the connector 15 and the power source terminal GND on the ground side. The connector 15 is connected to the device 20A such as a printer or the like via the cable 30.

The device 20A is provided with a transceiver section 21 for performing transmission/reception of data, a power supply section 24A for receiving source power supplied from the host 10A, and the like. The transceiver section 21 is connected to data terminals D+ and D− of a connector 25 via data lines DL+ and DL−. When the device 20A is intended for high speed data transfer, the data line DL+ is connected to the power source terminal VCC via a pull-up resistor 27. When the device 20A is intended for low speed data transfer, the data line PL− is connected to the power source terminal VCC via a pull-up resistor 28 in place of the pull-up resistor 27. The power source section 24A is connected to the power source terminal VCC of the connector 25 and the power source terminal GND on the ground side.

In the configuration shown in FIG. 3B, for example, when data of an image photographed by the host 10A of the electronic device or the like is transferred to the device 20A of a printer of the like, source power is output from the power supply section 14A on the host 10 side, and it is fed to the power supply section 24A on the device 20A via the cable 30. The source power received by the power supply section 24A is fed to an internal circuit of the device 20A so that the device 20A is put in an operable state. When the data of an image or the like is output from the transceiver section 11 on the host 10A side, it is transferred to the transceiver section 21 on the device 20A side via the cable 30. The data of an image or the like transferred is printed by the device 20A or processed by a certain device.

As shown in FIGS. 3A and 3B, the USB interface is clearly classified as having either a host function for controlling transmission/reception of a signal in an active manner or a device function for playing a passive role. However, in an electronic device such as a digital camera, for example, an interface circuit having both the host function and the device function is desired for user convenience.

In view of the above, integrating the host function and the device function on one interface circuit and having the functions share the USB signals (D+, D−) has been considered.

FIG. 4 is a configuration diagram of an interface circuit having a host function and a device function, which has been configured using a conventional art, where components or parts common to the components or parts shown in FIGS. 3A and 3B are denoted by common reference numerals.

In FIG. 4, an electronic device 10B such as a digital camera, for example, is caused to have a host function and a device function, and the electronic device 10B is connected to a host 20 such as a PC via a USB cable 30.

The electronic device 10B is provided with a host transceiver section 11A which performs transmission/reception of data, a device transceiver section 11B which performs transmission/reception of data and a power supply means 14B having a function for switching between a power supplying mode and a power receiving mode.

The host transceiver section 11A has a host function circuit 11A-1 which performs transmission/reception of data for the host function, and input and output terminals of the host function circuit 11A-1 are connected to data lines DL+ and DL−, and data terminals D+ and D− of a connector 15 via a USB buffer 11A-2. The USB buffer 11A-2 is configured by an output differential buffer 11A-2a which differentially amplifies data output from the host function circuit 11A-1 to output this amplified data to data lines DL+ and DL−, and an input differential buffer 11A-2b which differentially amplifies the data fed from the data lines DL+ and DL− to input the amplified data into the host function circuit 11A-1.

The device transceiver section 11B has a device function circuit 11B-1 which performs transmission/reception of data for the device function, and input and output terminals of the device function circuit are connected to data lines DL+ and DL−, and data terminals D+ and D− of the connector 15 via a USB buffer 11B-2. The USB buffer 11B-2 is configured by an output differential buffer 11B-2a which differentially amplifies data output from the device function circuit 11B-2 to output this amplified data to data lines DL+ and DL− and an input differential buffer 11B-2b. The input differential buffer 11B-2b differentially amplifies data output from the data lines DL+ and DL− to input the amplified into the device function circuit 11B-1.

The data lines DL+ and DL− are connected to power source terminals GND on the ground side via a pull-down resistor 16 and switching means 18-1. The data lines DL− and DL+ are connected to the power source terminals on the ground side via a pull-down resistor 17 and switching means 18-2. The switching means 18-1 and 18-2 have functions which turn ON according to a pull-down enable signal PDE for host to connect the pull-down resistors 16 and 17 to the power source terminals GND. When the electronic device 11B is intended for a high speed data transfer, for example, the data lines DL+ and DL− are connected to the power source terminals VCC via a pull-up resistor 12 for high speed data transfer and switching means 18-3. The switching means 18-3 has a function which turns ON according to a pull-up enable signal PUE for device to connect the pull-up resistor 12 to the power source terminal VCC.

Power supply means 14B is connected to the power source terminals VCC and GND of the connector via power supply lines PL+ and PL−. The power supply means 14B has a source power receiving/supplying switching function which receives source power fed from the host 20 via the cable 30 when the electronic device 10B is caused to have the device function and which outputs source power to supply it to the electronic device via the cable 30 when the device is caused to have the host function.

When a USB interface is performed in a state where a USB signal is shared, one of the host function and the device function of the electronic device 10B becomes unused. In general, each of the transceiver sections 11A and 11B is configured such that it waits in an input mode when unused. For example, when the device function of the electronic device 10B is employed, the host transceiver section 11A waits in an input mode under control of control means provided in the electronic device 10B, the switching means 18-1 and 18-2 are turned OFF according to the pull-down enable signal PDE, and the switching means 18-3 is turned OFF according to the pull-up enable signal PUE, and the power supply means 14B is switched to a power receiving mode.

Source power supplied from the power source section 24 on the host 20 side is received in the power supply means 14B on the electronic device 10B side via the cable 30 to be supplied to an internal circuit within the electronic device 10B. Like the case shown in FIG. 3B, when data is output from the device transceiver section 11B, it is sent to the transceiver section 21 on the host 20 side via the cable, so that the data sent may be displayed on a display or printed by a printer 26-3.

As shown in FIGS. 3A and 3B, the USB buffers 11A-2 and 11B-2 which perform a USB signal are designed assuming a one to one connection such as connection of the device 10 and the host 20, or connection of the host 10A and the device 20A. For this reason, when integration is conducted on an interface circuit, it is necessary to re-design the USB buffers 11A-2 and 11B-2 such that electrical characteristics of the USB standards can be met in a state where a USB signal is shared.

When a USB interface is implemented in the state sharing a USB signal, each of the USB buffers 11A-2 and 11B-2 is configured such that it waits in an input mode when unused. For example, when the electronic device 10B is caused to function as a device, the host USB buffer 11A-2 waits in an input mode. For this reason, for example, when the electronic device 10B has been connected to the host 20, the USB buffer which drives the USB cable 30 within the transceiver section 21 on the host side must drive loads corresponding to the two USB buffers 11A-2 and 11B-2 on the electronic device 10B side. In consideration of a load of the substrate wiring packaged with the interface circuit within the electronic device 10B, it is not easy to develop a sharable interface circuit within the electronic device 10B, which meets the electrical characteristics of the USB standards. Particularly, when the electronic device 10B is a small device such as a portable device, an interface circuit mounted on the small device is required to have ease of switching between the host function and the device function, a relatively simple circuit configuration and a small-size. However, it has been difficult to provide an interface circuit meeting these requirements.

SUMMARY OF THE INVENTION

The present invention has been made in order to solve the above problems in the conventional art. An object of the present invention is to provide an interface circuit where switching between a host function and a device function is made easily and which has a relatively simple circuit configuration and allows the interface circuit to have a small size.

In order to solve the above problems, according to a first aspect of the present invention, there is provided an interface circuit which has a host function and a device function and which allows sharing of a USB signal, the circuit comprising: a data terminal for connecting a data line for USB signal transmission; a power source terminal for connecting a power source line for source power transmission; a switch for generating a switching signal for selecting one of a host function and a device function; control means for controlling the entire of the interface circuit according to a program and which, when the switching signal is input, outputs one of a set of data for pull-down resistor connection and data for source power supply for performing the host function and a set of data for pull-up resistor connection and data for source power reception for performing the device function; a host function circuit for performing transmission/reception of data for host function by control of the control means; a device function circuit for transmitting and receiving data for device function by control of the control means; and a buffer for performs transmission/reception of data via the data terminal.

Furthermore, the interface circuit of the first aspect further comprises: selecting means for selecting one of the host function circuit and the device function circuit on the basis of the switching signal to connect the selected one to buffer; data holding means for holding the data for pull-up resistor connection, the data for source power supply, the data for pull-up resistor connection and the data for source power reception by control of the control means; pull-down means for connecting a pull-down resistor to the data terminal on the basis of the data for pull-down resistor connection; pull-up means for connecting a pull-up resistor to the data terminal on the basis of the data for pull-up resistor connection; and power supply means for performing one of an operation which supplies source power to the power supply terminal on the basis of the data for source power supply held in the data holding means and an operation which supplies source power received from the power supply terminal inside the interface circuit.

With the above configuration, when a switching signal is generated by the switch, one of the host function circuit and the device function circuit is selected, and the switching signal is input into the control means. Then, the data for performing the host function or the data for performing the device function is output from the control means to be held in the data holding means. According to the data held in the data holding means, the pull-down resistor is connected to the data terminal by the pull-down means or the pull-up resistor is connected to the data terminal by the pull-up means, so that switching in the power supply means between source power supply and source power reception is performed.

According to a second aspect of the present invention, there is provided an interface circuit which allows sharing of a USB signal, comprising: a data terminal for connecting a data line for USB signal transmission; a power source terminal for connecting a power source line for source power transmission; a switch which generates a switching signal for selecting one of a host function and a device function; control means for controlling the entire of the interface circuit according to a program and which, when the switching signal is input, outputs one of a set of data for pull-down resistor connection and data for source power supply for performing the host function or a set of data for pull-up resistor connection and data for source power reception for performing the device function; a host function circuit for performing transmission/reception of data for host function by control of the control means; a device function circuit for performing transmission/reception of data for device function by control of the control means; first buffer means for performing transmission/reception of data between the data terminal and one of the host function circuit and the device function circuit; and second buffer means for performing transmission/reception of data between the data terminal and the other of the host function circuit and the device function circuit.

Also, the above interface circuit of the second aspect further comprises: selecting means which selects one of the host function circuit and the device function circuit on the basis of the switching signal to connect the selected one to the first buffer; data holding means which holds the data for pull-up resistor connection, the data for source power supply, the data for pull-up resistor connection and the data for source power reception by control of the control means; pull-down means which connects a pull-down resistor to the data terminal on the basis of the data for pull-down resistor connection; pull-up means which connects a pull-up resistor to the data terminal on the basis of the data for pull-up resistor connection; and power supply means which performs at least one of an operation which supplies source power to the power source terminal on the basis of the data for source power supply held in the data holding means and an operation which supplies source power received from the power source terminal to inside of the interface circuit on the basis of the data for source power reception held in the data holding means.

With such a configuration, when a switching signal is generated by the switch, either one of the host function circuit and the device function circuit is selected by the selecting means to be connected to the first buffer. Thereby, an operation which is approximately similar to the first aspect is performed. When the second buffer is connected to another data terminal, the another data terminal can be employed as needs.

As described above, according to the first and second aspects, since such a configuration has been employed that switching between the host function and the device function is performed in the selecting means using the switch, the switching between the host function and the device function can easily be performed, these functions can be achieved by a relatively simple circuit configuration and the interface circuits of the first and second aspects can be small-sized. Also, it becomes possible to realize switching between the host function and the device function using an existing USB buffer as it is without changing the electric characteristics of the USB buffer. Furthermore, since such a configuration has been employed that data output from the control means is held in the data holding means, connections of the pull-down means and the pull-up means are controlled according to the output of the data holding means, and source power supply or source power reception of the power supply means is controlled according thereto, control load on the control means which controls the interface circuit can be reduced.

According to a third aspect of the present invention, there is provided an interface circuit which allows shearing of a USB signal, comprising: first and second data terminals for connecting two data lines for USB signal transmission, respectively; a power source terminal for connecting a power source line for source power transmission; a first switch which generates a first switching signal for selecting either one of a host function and a device function; a second switch which generates a second switching signal for selecting either one of the host function and the device function; control means which controls the entire of the interface circuit according to a program and which, when the first and second switching signal are input, outputs one of a set of data for pull-down resistor connection and data for source power supply for performing the host function and a set of data for pull-up resistor connection and data for source power reception for performing the device function; a host function circuit which performs transmission/reception of data for host function by control of the control means; a device function circuit for performing transmission/reception of data for device function by control of the control means; first buffer means which performs transmission/reception of data between the first data terminal and one of the host function circuit and the device function circuit; and second buffer means which performs transmission/reception of data between the second data terminal and the other of the host function circuit and the device function circuit.

The interface circuit of this aspect further comprises: first selecting means for selecting one of the host function circuit and the device function circuit on the basis of the first switching signal to connect the selected one to the first buffer means; second selecting means for selecting the other of the host function circuit and the device function circuit on the basis of the second switching signal to connect the selected one to the second buffer means; data holding means for holding the data for pull-up resistor connection, the data for source power supply, the data for pull-up resistor connection and the data for source power reception by control of the control means; pull-down means for connecting a pull-down resistor to one of the first and second data terminals on the basis of the data for pull-down resistor connection; pull-up means for connecting a pull-up resistor to one of the second and first data terminals on the basis of the data for pull-up resistor connection; and power supply means for performing one of an operation for supplying source power to the power source terminal on the basis of the data for source power supply held in the data holding means and an operation for supplying source power received from the power source terminal to inside of the interface circuit on the basis of the data for source power reception held in the data holding means.

With such a configuration, when the first and second switching signals are generated by the first and second switches, either one of the host function circuit and the device function circuit is selected by the first selecting means to be connected to the first buffer, while either one of the host function circuit and the device function circuit is selected by the second selecting means to be connected to the second buffer. Thereby, the host and device can arbitrarily be allocated to the first and second data terminals, so that a USB interface to the first data terminal and the second data terminal can be achieved like the interface circuit of the first aspect.

According to the third aspect, since such a configuration has been employed that switching between the host function and the device function is performed in the first and second selecting means by the first and second switches, the switching between the host function and the device function can easily be performed, these functions can be achieved by a relatively simple circuit configuration and the interface circuits of the first and second aspects can be small-sized like the first and second aspects. Also, it becomes possible to realize switching between the host function and the device function using an existing USB buffer as it is without changing the electric characteristics of the USB buffer. Furthermore, since the data output from the control means is held in the data holding means, and the pull-down means, the pull-up means and the power supply means are controlled according to the output of the data holding means, control load of the control means can be reduced. Moreover, in third aspect, the host and the device can arbitrarily be allocated to the first and second data terminals, so that convenience of use can further be improved.

A fourth aspect of the present invention is an interface circuit according to one of the first to third aspects, wherein the control means comprises a micro-computer (hereinafter, referred to as "MC").

According to the fourth aspect, since the control means comprises the MC, the interface circuit can further be size-reduced.

A fifth aspect of the present invention is an interface circuit according to one of the first to fourth aspects, wherein the buffer comprises an output differential buffer and an input differential buffer which are connected in parallel to the data terminal.

According to the fifth aspect, since the buffer means is constituted by the output differential buffer and the input differential buffer, output of data and input of data can be performed securely.

A sixth aspect is an interface circuit according to one of the first to fifth aspects, wherein the selecting means comprises a multiplexer.

According to the sixth aspect, since the selecting means is constituted by the multiplexer, the selecting means can be constituted by a relatively simple circuit configuration.

A seventh aspect is an interface circuit according to one of the first to sixth aspects, wherein the data holding means comprises a register.

According to the seventh aspect, since the data holding means is constituted by the register, integration of the interface circuit is facilitated.

An eighth aspect is an interface circuit according to one of the first to seventh aspects, wherein the pull-down means comprises switch means which is turned ON according to the data for pull-down resistor connection and a pull-down resistor.

According to the eighth aspect, since the pull-down means is constituted by the switch means and the pull-down resistor, control on connection of the pull-down resistor can easily be performed by switching between ON state and OFF state of the switch means.

A ninth aspect is an interface circuit according to one of the first to seventh aspects, wherein the pull-up means comprises switch means which is turned ON according to the data for pull-up resistor connection and a pull-up resistor.

According to the ninth aspect, since the pull-up means is constituted by the switch means and the pull-up resistor, control on connection of the pull-up resistor can easily be performed by switching between ON state and OFF state of the switch means.

A tenth aspect is an interface circuit according to one of the first to ninth aspects, wherein the switch is provided in one of the interface circuit and another interface circuit connected to the data terminal.

According to the tenth aspect, since the switch is provided in one of the interface circuit and another interface circuit, switching between the host function and the device function can easily be performed by switching between ON state and OFF state of the switch means.

BRIEF DESCRIPTION OF THE DRAWINGS

FIG. 2 is a schematic configuration diagram of an electronic device mounted with an interface circuit allowing sharing of a USB signal, which shows a second embodiment of the present invention;

DETAILED DESCRIPTION OF THE PREFERRED EMBODIMENTS

First Embodiment

Figure 1:
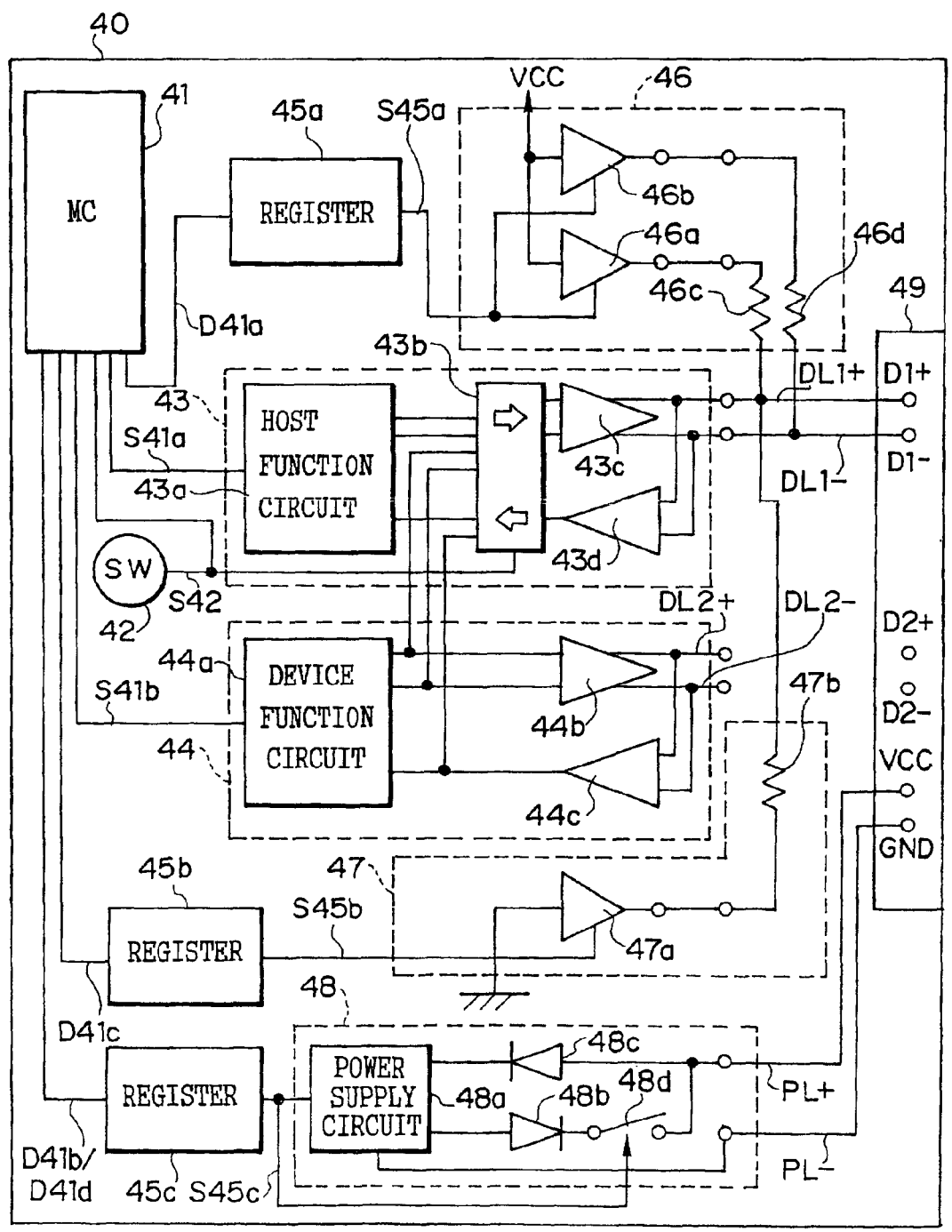
FIG. 1 is a schematic configuration diagram of an electronic device mounted with an interface circuit allowing sharing of a USB signal, which shows a first embodiment of the present invention.

FIG. 1 is a schematic configuration diagram of an electronic device such as a digital camera or the like which is equipped with an interface circuit which allows sharing of a USB signal, which shows a first embodiment of the present invention.

An electronic device 40 such as a digital camera or the like is provided with control means, for example, a microcomputer (MC) 41 which controls the whole electronic device or a whole interface circuit according to a program. Connected to the MC 41 are a switch (for example, a manual switch (SW) provided on the side of the electronic device 40) which generates a switching signal S42 for selecting one of a host function and a device function, a transceiver section for host or host transceiver section 43, a transceiver section for device or device transceiver section 44, and data holding means, for example, including registers 45a, 45b and 45c.

The MC 41 has functions which outputs a control signal S41a input into the host transceiver section 43 and a control signal S41b input into the device transceiver section 44 when the MC 41 is input with the switching signal S42, and output a set of data D41a for pull-down resistor connection and data D41b for source power supply for performing a host function or output a set of data D41c for pull-up resistor connection and data D41d for source power reception for performing a device function. The data D41a of the data D41a to D41d output from the MC 41 is held in the register 45a, the data D41b or D41d is held in the register 45c and the data D41c is held in the register 45b, respectively.

The host transceiver section 43 is provided with a host function circuit 43a which performs transmission/reception of data for host function. Output and input terminals of the host function circuit 43a are connected with a first buffer via selecting means (for example, a selecting circuit comprising a multiplexer or the like) 43b. First buffer (means) is constituted by an output differential buffer 43c whose input terminals are connected to output terminals of the selecting circuit 43b and whose output terminals are connected to first data terminals D1+ and D1− of a USB connector 49 via data lines DL1+ and DL−, and an input differential buffer 43d whose input terminals are connected to the first data terminals D1+ and D1− of the connector 49 via the data lines DL1+ and DL− and whose output terminal is connected to the input terminal of the selecting circuit 43b.

The device transceiver section 44 is provided with a device function circuit 44a which performs transmission/ reception of data for device function. Output and input terminals of the device function circuit 44a are connected to the selecting circuit 43b and a second buffer (means). The second buffer is constituted by an output differential buffer 44b whose input terminals are connected to the output terminals of the device function circuit 44a and whose output terminals are connected to data lines DL2+ and DL2−, and an input differential buffer 44c whose input terminals are connected to the data lines DL2+ and DL2− and whose output terminal is connected to the input terminal of the device function circuit 44a.

The selecting circuit 43b is a circuit which selects one of the host function circuit 43a and the device function circuit 44a according to the switching signal S42 generated from the switch 42 to connect the selected one to the output differential buffer 43c and the input differential buffer 43d. The output differential buffer 43c is a circuit which differentially amplifies output data of the selecting circuit 43b to output the same to the data terminals D1+ and D1− of the connector 49 via the data lines DL1+ and DL−. The input differential buffer 43d is a circuit which differentially amplifies data sent from the data lines D1+ and D1− via the data lines DL1+ and DL1− to output the amplified data into the selecting circuit 43b. The output differential buffer 44b is a circuit which differentially amplifies output data of the device function circuit 44a to output the amplified data to the data lines DL2+ and DL2−. The input differential buffer 44c is a circuit which differentially amplifies data sent from the data lines DL2+ and DL2− to output this amplified data to the device function circuit 44a.

The register 45a of the registers 45a to 45c is a circuit which holds the data D41a for pull-down resistor connection output from the MC 41 to output a pull-down enable signal S45a for host at a predetermined timing and whose output terminal is connected with pull-down means 46. The pull-down means 46 is configured so as to connect pull-down resistors to the data lines DL1+ and DL1− according to the pull-down enable signal S45a for host and it is provided with switching means, for example, including tri-state inverters 46a and 46b, which is turned ON according to the pull-down enable signal S45a and pull-down resistors 46c and 46d.

The tri-state inverter 46a is a circuit whose input terminal is connected to a power source terminal VCC, which, when the pull-down enable signal S45a input to a control terminal is in "H" level, is turned ON to invert "H" level of the input terminal and output the potential of "L" level, and whose output terminal is changed to a high impedance state when the pull-down enable signal S45a is in "L" level. The tri-state inverter 46b is a circuit whose input terminal is connected to the power source terminal VCC, which, when the pull-down enable signal S45a input into a control terminal is in "H" level, is turned ON to invert "H" level of the input terminal and output the potential of "L" level from an output terminal, and whose output terminal is changed to a high impedance state when the pull-down enable signal S45a is in "L" level. The output terminal of the tri-state inverter 46a is connected to the data line DL1− via a pull-down resistor 46d.

The register 45b is a circuit which holds data D41c for pull-up resistor connection input from the MC 41 to output a pull-up enable signal S45b for device at a predetermined timing, and whose output side is connected with pull-up means 47. The pull-up means 47 is a circuit which connects pull-up resistors to the data lines DL1+ and DL1− or the like according to the pull-up enable signal S45b, and it is provided with switching means (for example, a tri-state inverter) 47a which is turned ON according to the pull-up enable signal S45b and a pull-up resistor (for example, a pull-up resistor for a high speed transfer) 47b.

The tri-state inverter 47a is a circuit whose input terminal is connected to a power source terminal GND on the ground side, which, when the pull-up enable signal S45b input from the control terminal is in "H" level, is turned ON to invert "L" level of the input terminal and output the potential of "H" level from an output terminal, and whose output terminal is changed to a high impedance state when the pull-up enable signal S45b is in "L" level. The output terminal of the tri-state inverter 47a is connected to the data line DL1+ and the like via the pull-up resistor 47b. In place of the pull-up resistor 47b for a high speed data transfer, a pull-up resistor for a low speed data transfer may be connected between the output terminal of the tri-state inverter 47a and the power source line DL1− or the like.

The register 45c is a circuit which holds the data D41b for power source supply or the data D41d for power source reception output from the MC 41 to output the switching signal S45c which performs switching between source power supplying and source power receiving at a predetermined timing, and the output thereof is connected with power supply means 48. The power supply means 48 is configured so as to supply source power to the power source terminal VCC of the connector 49 and the source power terminal GND on the ground side via the power source lines PL+ and PL− or supply source power received from the power source terminals VCC and GND via the power source lines PL+ and PL− to an internal circuit of the electronic device 40, and it comprises a power supply circuit 48a, diodes 48b and 48c, and a switch element 48d such as a transistor or the like.

The power supply circuit 48a is a circuit which is constituted by a source power supplying circuit, a source power receiving circuit and the like, which is provided with a control terminal through which the switching signal S45c is input, an input terminal connected to a cathode of the diode 48c, an output terminal connected to an anode of the diode 48b and a ground terminal connected to the power source terminal GND of the connector 49 via the power source line PL−, and which outputs source power output from the source power supplying circuit when the switching signal S45c is in a source power supplying mode, and receives source power input from the input terminal in the source power receiving circuit when the switching signal S45c is in a source power receiving mode. The cathode of the diode 48b is connected to the power source terminal VCC of the connector 49 via the switching element 48d operating in an ON/OFF manner according to the switching signal S45c and the power source line PL+. The anode of the diode 48c is connected to the power source terminal VCC of the connector 49 via the power source line PL+.

Figure 3A:
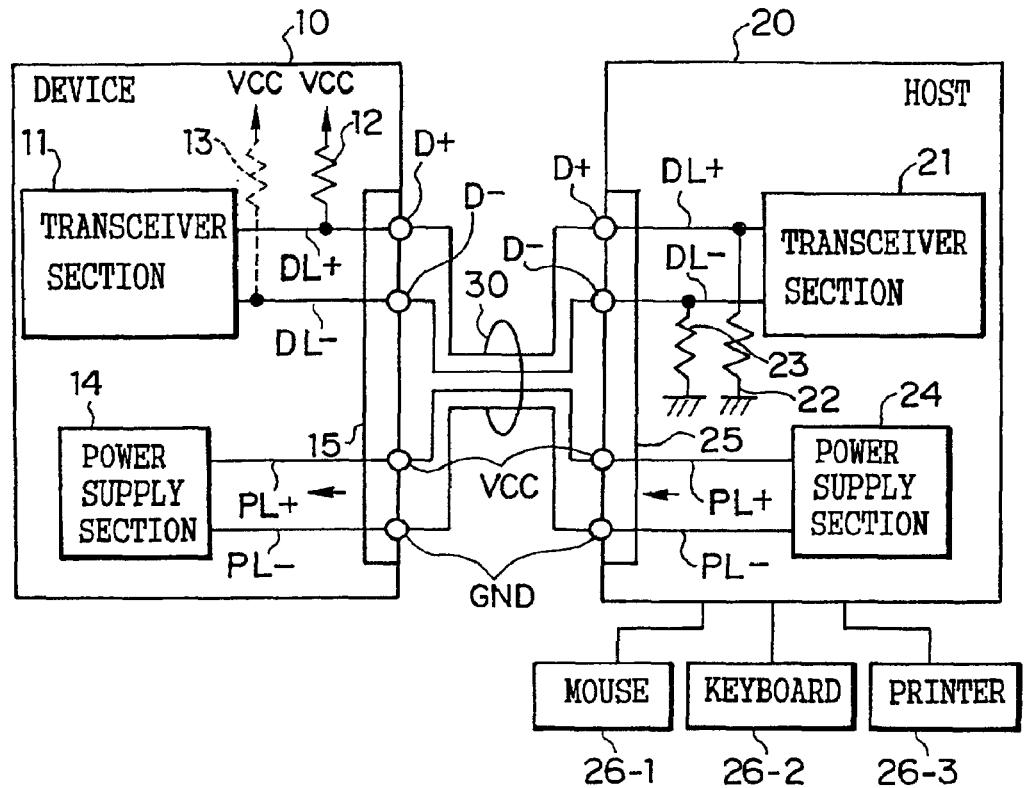
FIGS. 3A and 3B are configuration diagrams showing connection examples of a host and a device which are mounted with a conventional interface circuit of a USB standard.
Figure 3B:
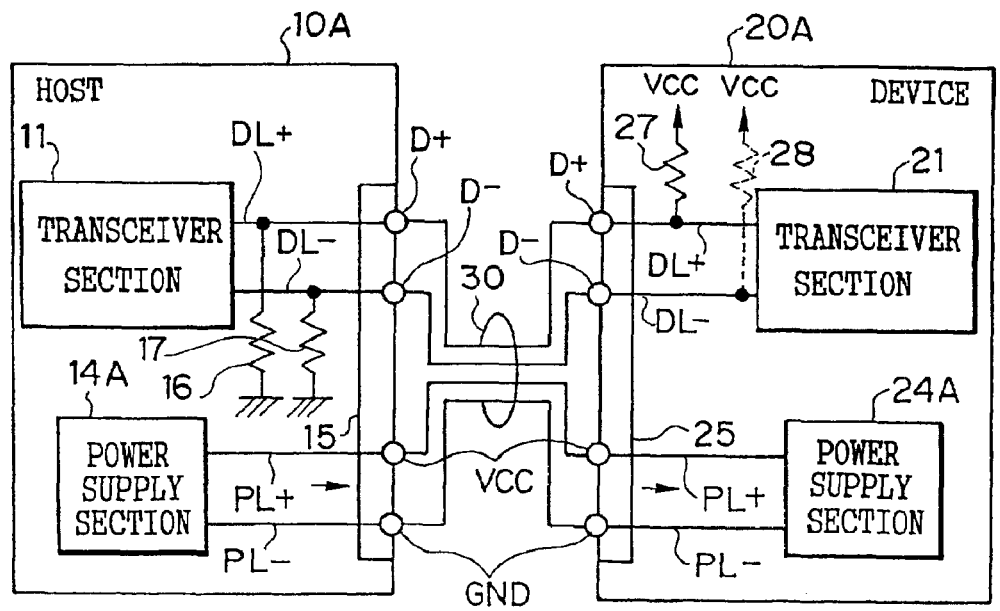
Figure 4:
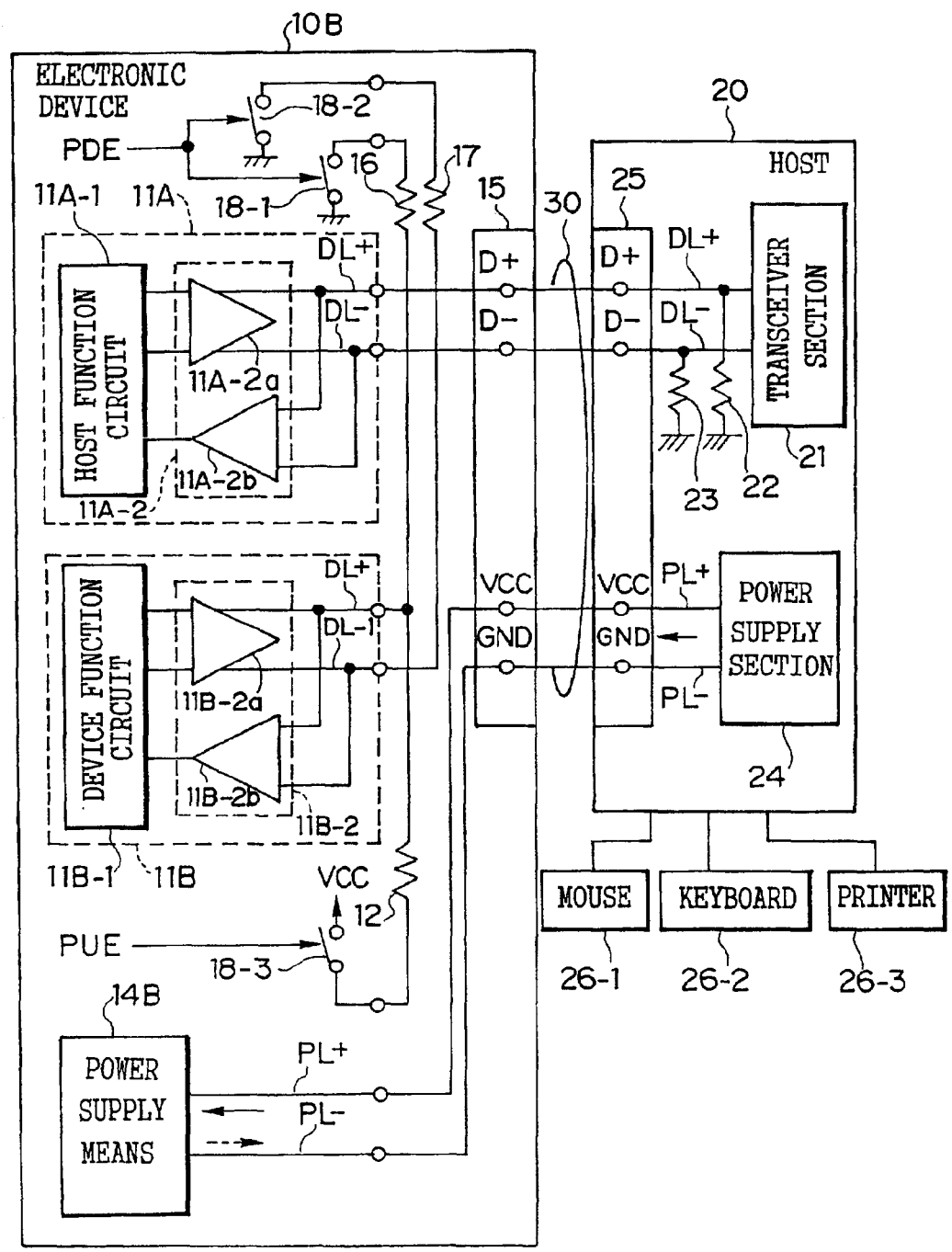
FIG. 4 is a configuration diagram of a conventional interface circuit having a host function and a device function.

The connector 49 has not only the first data terminals D1+ and D1− and the power source terminals VCC and GND but also second data terminals D2+, D2− and the like connected to the data lines DL2+ and DL2− as necessary, and these terminals D2+, D2− and the like are connected to a host 20 such as a PC, a device such as a printer via the USB cable 30 shown in FIGS. 3A and 3B, for example.

Next, a host operation (1), a device operation (2) and a host/device operation (3) using the electronic device 40 shown in FIG. 1 will be explained.

(1) Host Operation Using the Data Terminals D1+ and D1− of the Connector 49

A host operation of the electronic device 40 conducted, for example, when a device 20A such as a printer or the like is connected via a cable 30 such as shown in FIG. 3B using the data terminals D1+ and D1− and the power source terminals VCC and GND of the connector 49 will be explained.

When a host switching signal S42 is generated by operating the switch 42, the selecting circuit 43b is switched to the host function circuit 43a side and the switching signal S42 is input into the MC 41. The MC 41 outputs the control signal S41a, the data D41a for pull-down resistor connection, and the data D41b for source power supply according to a program. The host function circuit 43a is made operable according to the control signal S41a, and the data D41a is held in the register 45a and the data D41b is held in the register 45c.

When the data D41a is held in the register 45a, the pull-down enable signal S45a for host of "H" level is output from the register 45a, and the tri-state inverters 46a and 46b are turned ON. When the tri-state inverters 46a and 46b are turned ON, "H" level of the power source terminal VCC connected to the input terminals thereof is inverted and the output terminals of the tri-state inverters 46a and 46b fall down to "L" level. Thereby, the data lines DL1+ and DL−, and the data lines D1+ and D1− are connected to the power source terminal GND on the ground side via the pull-down resistors 46c and 46d.

When the data D41b is held in the register 45c, the switching signal S45c is output from the register 45c so that the power supply circuit 48a is turned to the source power supplying mode and the switch element 48d is turned ON. When the switch element 48d is turned ON, source power output from the power supply circuit 48a is output from the power source terminal VCC of the connector 49 via the diode 48b, the switch element 48d and the power source line PL+. The source power output from the power source terminal VCC of the connector 49 is fed to the device 20A such as a printer or the like via such a cable 30 as shown in FIG. 3B. On the device 20A side, the source power fed from the electronic device 40 is received at the power supply section 24A so that the transceiver section 21 and the like are made operable.

In the host function circuit 43a, data for host function such as image data or the like is output. The data for host function passes through the selecting circuit 43b to be differentially amplified in the output differential buffer 43c and output from the data terminals D1+ and D1− of the connector 49 via the data lines DL1+ and DL1−. This amplified data is transmitted to the transceiver section 21 in the device 20A through the cable 30 shown in FIG. 3B and printing operation or another operation is conducted by the device 20A. At this time, the signal transmitted to the electronic device 40 from the device 20A side through the cable 30 is differentially amplified in the input differential buffer 43d through the data terminals D1+ and D1− of the connector 49, and the data lines DL1+ and DL1− to be input into the host function circuit 43a through the selecting circuit 43b where predetermined transmission/reception is performed.

(2) Device Operation Using the Data Terminals D1+ and D1− of the Connector 49

For example, in a case that the host 20 such as a PC or the like is connected to the data terminals D1+ and D1− of the connector 49 via such a cable 30 as shown in FIG. 3A, a switching signal S42 for selecting the device function is generated by operating the switch 42. According to the switching signal S42 generated from the switch 42, the selecting circuit 43b is switched to the device function circuit 44a side and the switching signal S42 is input into the MC 41. When the switching signal S42 is input into the MC 41, the MC 41 outputs the control signal S41b to make the device function circuit 44a operable, and it outputs the data D41c for pull-up resistor connector to cause the register 45b to hold the data and outputs the data D41d for source power reception to cause the register 45c to hold the data. When the data D41d is held in the register 45c, a switching signal S45c is output from the register 45c so that the power supply circuit 48a is switched to the source power receiving mode and the switching element 48d is turned OFF.

Then, the source power fed from the power supply section 24 on the host 20 side shown in FIG. 3A is supplied to the power source terminals VCC and GND of the connector 49 via the cable 30. The source power supplied to the power source terminals VCC and GND is received in the source power receiving circuit inside the power supply circuit 48a via the diode 48c, and the source power received is supplied to the internal circuit in the electronic device 40. When the data D41c output from the MC 41 is held in the register 45b, the pull-up enable signal S45b for device of "H" level is output so that the tri-state inverter 47a is turned ON. When the tri-state inverter 47a is turned ON, "L" level of the power source terminal GND of the ground side which is connected to the input terminal of the inverter 47a is inverted and the output terminal of the inverter 47a becomes "H" level. When the output terminal of the tri-state inverter 47a becomes "H" level, the data line DL1+ and the data terminal D1+ are pulled up.

For example, when data of data transfer command is output from the transceiver section 21 of the host 20 side shown in FIG. 3A, the data is sent to the data terminals D1+ and D1− of the connector 49 via the cable 30. The data which has been sent to the data terminals D1+ and D1− is differentially amplified in the input differential buffer 43d via the data lines DL1+ and DL1− to be supplied to the device function circuit 44a via the selecting circuit 43b. Then, data such as image data or the like is output from the device function circuit 44a to be differentially amplified in the output differential buffer 43c via the selecting circuit 43b so that the amplified data is output from the data terminals D1+ and D1− of the connector 49 via the data lines DL1+ and DL1−. The data which has been output from the data terminals D1+ and D1− is fed to the transceiver section 21 on the host 20 side via the cable 30 so that displaying of data such as image data or the like is performed.

(3) Host/Device Operation Using the Data Terminals D1+ and D1−, and D2+ and D2− of the Connector 49.

For example, in a case that the data terminals D1+ and D1− of the connector 49 are used for host, and the data terminals D2+ and D2− are used for device, the output differential buffer 43c and the input differential buffer 43d on the host side are connected to the data terminals D1+ and D1− via the data lines DL1+ and DL1−, and the data lines DL1+ and DL1− are connected with the pull-down means 46. Furthermore, the output differential buffer 44b and the input differential buffer 44c on the device side are connected to the data terminals D2+ and D2− via the data lines DL1+ and DL1−, and the data lines DL2+ and DL2− are connected with the pull-up means 47. Then, when a switching signal S42 for selecting the host function is generated by operating the switch 42, the selecting circuit 43b is switched to the host function circuit 43a side according to the switching signal S42 and the switching signal S42 is input into the MC 41.

When the electronic device 40 is used for host, for example, the data terminals D1+ and D1− of the connector 49 are connected with the device 20A such as a printer or the like via the cable 30 such as shown in FIG. 3B. The MC 41 which has been input with the switching signal S42 outputs the control signal S41a to make the host function circuit 43a operable and outputs the data D41a for pull-down resistor connection and the data D41b for source power supply to cause the register 45a to hold the data D41a and cause the register 45c to hold the data D41b. Thereby, the electronic device 40 serves as a host to the device 20A connected to the data terminals D1+ and D1− of the connector 49.

Also, when the electronic device 40 is employed as a device, for example, the host 20 such as a PC or the like is connected to the data terminals D2+ and D2− of the connector 49 via such a cable 30 as shown in FIG. 3A. The MC 41 in which the switching signal S42 is input outputs the control signal S41b to make the device function circuit 44a operable and outputs the data D41c for pull-up resistor connection and the data D41d for source power reception to cause the register 45b to hold the data 41c and to cause the register 45c to hold the data 41d. Thereby, the electronic device 40 operates as a device to the host 20.

As mentioned above, the following effects (i) to (iv) can be achieved by the first embodiment.

(i) In a case that the data terminals D1+ and D1− of the connector 49 are common to host and device, using an existing USB buffer comprising the output differential buffer 43c and the input differential buffer 43d, one of the host function and the device function can be realized only by connecting the device 20A or the host 20 to the data terminals D1+ and D1− through the cable 30 shown in FIG. 3A or 3B and operating the switch 42 to select the host function or the device function and generate a switching signal S42 by the switch 42 without changing electric characteristics of the USB buffer. In addition, by operating the switch 42 to perform switching of the selection circuit 43b to the host side or the device side, switching between the host function and the device function can easily be performed, and these functions can also be realized by a relatively simple circuit configuration and small-sizing of the interface circuit can be achieved.

(ii) In FIG. 1, a transceiver section 44 for host is provided, but it is unnecessary to provide the transceiver section 44 in order to achieve the effect (ii). Assuming that the transceiver section 44 is omitted, the circuit configuration can further be simplified and size reduction of the interface circuit can be achieved.

(iii) In a case that the host transceiver section 43 and the device transceiver section 44 are provided and individual connectors are respectively used for the host and the device, the data terminals D1+ and D1−, and D2+ and D2− can be used simultaneously, and the device transceiver section 44 can be utilized effectively.

(iv) Since a configuration is employed such that data items D41a to D41d output from the microcomputer 41 are held in the registers 45a to 45c, and the pull-down means 46, the pull-up means 47 and the power supply means 48 are controlled according to signals output from these registers 45a to 45c, a burden of control on the MC 41 is reduced and the MC 41 can effectively be utilized for the entire control of the electronic equipment 40.

Second Embodiment

FIG. 2 is a schematic configuration diagram of an electronic equipment such as a digital camera or the like provided with an interface circuit allowing sharing of a USB signal according to a second embodiment of the present invention, where elements or parts common to those in FIG.

1 showing the first embodiment are attached with the same reference numerals.

An electronic device or equipment 40A such as a digital camera or the like has control means (for example, a MC) 41A whose program is different from that of the microcomputer 41 in FIG. 1. Connected to the microcomputer 41A are first and second switches (for example, manual switches (SW)) 42-1 and 42-2, a host transceiver section 43A, a device transceiver section 44A, and data holding means (for example, registers 45a, 45c, 45d and 45e) and the like. The switch 42-1 is configured so as to generate a first switching signal S42-1 for selecting one of the host function and the device function, and the switching signal S42-1 is input into the MC 41A and the host transceiver section 43A. The switch 42-2 is configured so as to generate a second switching signal S42-2 for selecting one of the host function and the device function, and the switching signal S42-2 is input into the MC 41A and the transceiver section 44A for device.

The MC 41A controls the entire electronic device 40A according to a program and outputs control signals S41a, S41b and the like. Also, the MC 41A has a function which outputs data D41a for pull-down resistor connection, data D41b for source power supply, data D41d for source power reception, data D41e for host/device switching, or data D41f for pull-up/pull-down resistor connection when it is input with the switching signals S42-1 and S42-2.

A register 45a is a circuit which holds the data D41a for pull-down resistor connection and outputs a host pull-down enable signal S45a at a predetermined timing to pull-down means 46 as in the first embodiment. A register 45c is a circuit which holds the data D41b for source power supply or the data D41d for source power reception and outputs a switching signal S45c to a power source means 48 like the first embodiment. A register 45d is a circuit which holds the data D41e for host/device switching and outputs a host/device switching signal S45d at a predetermined timing. A register 45e is a circuit which holds the data D41f for pull-up/pull-down resistor connection and outputs an enable signal S45e at a predetermined timing.

The host transceiver section 43A comprises a host function circuit 43a which performs transmission/reception of data for host function according to the control signal S41a, first selecting means (for example, selecting circuit) 43b which selects one of the host function circuit 43a and a device function circuit 44a according to the switching signal S42-1, and a first buffer means (for example, an output differential buffer 43c and an input differential buffer 43d) which performs transmission/reception of data. The output differential buffer 43c and the input differential buffer 43d are connected to first data terminals D1+ and D1− of a connector 49 via data lines DL1+ and DL1−. The device transceiver section 44A comprises a device function circuit 44a which performs transmission/reception of data for device function according to the control signal S41b, second selecting means (for example, second selecting circuit) 44d which selects one of the host function circuit 43a and the device function circuit 44a according to the switching signal S42-2, and second buffer means (for example, an output differential buffer 44b and an input differential buffer 44c) which performs transmission/reception of data. The output differential buffer 44b and the input differential buffer 44c are connected to second data terminals D2+ and D2− of the connector 49 via data lines DL2+ and DL2−.

Output terminals of the registers 45d and 45e are connected with pull-up/pull-down means 50 in which the host/device switching signal S45d and the enable signal S45e are input. The pull-up/pull-down means 50 has a function which performs pull-up of data lines DL1+ and DL2+ in a case of a high speed data transfer, and performs pull-up of data lines DL1− and DL2− or pull-down of data lines DL2+ and DL2− in a case of a low speed transfer on the basis of the host/device switching signal S45d and the enable signal S45e, and it comprises a two-input AND gate 50a, switch means (for example, a tri-state inverter) 50b and 50c, and resistors 50d and 50e for pull-up and pull-down.

The two input terminals of the AND gate 50a are connected to output terminals of the registers 45d and 45e. In the tri-state inverter 50b, its input terminal is connected to an output terminal of the register 45d and its control terminal is connected to an output terminal of the register 45e. An output terminal of the AND gate 50a is connected to a control terminal of the tri-state inverter 50c, and an input terminal of the tri-state inverter 50c is connected to a power source terminal VCC. An output terminal of the tri-state inverter 50b is connected to the data line DL2+ and the like via a resistor 50d, and an output terminal of the tri-state inverter 50c is connected to the data line DL2− and the like via a resistor 50e.

In the inverter circuit shown in FIG. 2, a configuration has been employed such that the selecting circuit 43b is provided in the host transceiver section 43A and the selecting circuit 44d is provided in the device transceiver section 44A so that the host and the device can arbitrarily be allocated to the first data terminals D1+ and D1−, and the second data terminals D2+ and D2−.

Next, host operations and device operations (1) to (3) of the electronic device 40A shown in FIG. 2 will be explained.

(1) Host/Device Operation Using Data Terminals D1+ and D1−, or D2+ and D2− of Connector 49.

In a case that one data terminal set is common to host and device, either the first data terminals D1+ and D1−, or the second data terminals D2+ and D2− are used. When the first data terminals D1+ and D1− are used, a device 20A such as a printer or the like shown in FIG. 3B is connected to the data terminals D1+ and D1− via the cable 30, or the host 20 such as a PC shown in FIG. 3A is connected thereto.

When the device 20A is connected to the data terminals D1+ and D1−, the switching signal S42-1 for selecting the host function is generated by operating the switch 42-1. According to this switching signal S42-1, the selecting circuit 43b is switched to the host function circuit 43a and the switching signal S42-1 is input in the MC 41A. The control signal S41a is output from the MC 41A so that the host function circuit 43a is made operable. Furthermore, the data D41a for pull-down resistor connection and the data D41b for source power supply are output and this data 41a is held in the register 45a and the data D41b is held in the register 45c.

When the data D41b is held in the register 45c, the switching signal S45c is output from this register 45c, and source power is output from the power source means 48. The source power is output from the power source terminals VCC and GND of the connector 49 via power source lines PL+ and PL− to be supplied to the device 20A via the cable 30 shown in FIG. 3B. On the other hand, when the data D41a is held in the register 45a, the pull-down enable signal S45a for host is output from the register 45a so that the tri-state inverters 46a and 46b are turned on and the data lines DL1+ and DL1−, and the data terminals D1+ and D1− of the connector 49 are pulled down via pull-down resistors 46c and 46d.

When data such as image data is output from the host function circuit 43a, the data is differentially amplified at the output differential buffer 43c via the selecting circuit 43b and the amplified data is output from the data terminals D1+ and D1− of the connector 49 via the data lines DL1+ and DL1− to be sent to the device 20A via the cable 30 shown in FIG. 3. The output data from the device 20A is input in the data terminals D1+ and D1− of the connector 49 via the cable 30, it is differentially amplified at the input differential buffer 43d via the data lines DL1+ and DL1−, and the amplified data is input into the host function circuit 43a via the selecting circuit 43b where the data is processed for reception.

When the host 20 such as shown in FIG. 3A is connected to the data terminals D1+ and D1− of the connector 49, an operation is performed in advance such that the output terminal of the tri-state inverter 50b in the pull-up/pull-down means 50 is connected to the data line DL1+ via the resistor 50d and the output terminal of the tri-state inverter 50c is connected to the data line DL1− via the resistor 50e.

By operating the switch 42-1, the switching signal S42-1 for selecting the device function is generated to perform switching of the selecting circuit 43b to the device function circuit 44a and the switching signal S42-1 is input into the MC 41A. Thereby, the control signal S41b is output from the MC 41A to make the device function circuit 44a operable and the data D41d for source power reception, the data D41e for host/device switching, and the data D41f for pull-up/pull-down resistor connection are output from the MC 41A. The data D41d, the data D41e and the data D41f are respectively held in the register 45c, the register 45d and the register 45e.

When the data D41d is held in the register 45c, the switching signal S45c is output from the register 45c, the switching signal S45c is output from the register 45c so that the power source means 48 is switched to a source power receiving mode. Here, since the pull-up/pull-down means 50 is connected for a high speed data transfer, when the data D41e and data D41f from the MC 41A are held in the registers 45d and 45e, a host/device switching signal S45d of "L" level is output from the register 45d and an enable signal S45e of "H" level is output from the register 45e.

The tri-state inverter 50b is turned on by the enable signal S45e of "H" level, and "L" level of the input terminal of the tri-state inverter 50b is inverted and the output terminal thereof becomes "H" level, so that the data line DL1+ and the data line DL2+ of the connector 49 are pulled up via the resistor 50d. Since two input terminals of the AND gate 50a are input with "L" level and "H" high, the output terminal of the AND gate 50a becomes "L" level and the output terminal of the tri-state inverter 50c becomes a high impedance state.

Source power is output from the host 20 side shown in FIG. 3A to be supplied to the power source terminals VCC and GND of the connector 49 via the cable 30. The supplied source power is received at the power source means 48 via power source lines PL+ and PL1, and the received source power is supplied to an internal circuit of the electronic device 40A. Data transmitted from the host 20 side via the cable is input into the data terminals D1+ and D1− of the connector 49. This data is differentially amplified at the input differential buffer 43d via the data lines DL1+ and DL1− and the amplified data is subjected to reception processing at the device function circuit 44a via the selecting circuit 43b.

When data such as image data or the like is output from the device function circuit 44a, the data is differentially amplified at the output differential buffer 43c via the selecting circuit 43b and the amplified data is output from the data terminals D1+ and D1− of the connector 49 via the data lines DL1+ and DL1−. This data is transmitted to the host 20 side via the cable 30 and display or the like for the data is performed on the host 20.

Even when the data terminals D2+ and D2− of the connector 49 are used, the host operation or the device operation is performed substantially in the same manner as the above.

(2) Host/Device Operation Using Data Terminals D1+ and D1−, and D2+ and D2− of Connector 49.

When a set of the data terminals D1+ and D1−, and a set of the data terminals D2+ and D2− are individually used in the host and the device, either one of the set of the data terminals D1+ and D1−, and the set of the data terminals D2+ and D2− are connected with the device 20A or the host 20 via two cables 30 such as shown in FIGS. 3A and 3B. In a case of such a use, two sets of power source terminals VCC and GND, power source means 48 and the like are provided in the electronic device 40A in advance.

For example, in a case that the device 20A is connected to the data terminals D1+ and D1−, and the host 20 is connected to the data terminals D2+ and D2−, the switches 42-1 and 42-2 are operated to generate switching signals S42-1 and S42-2 so that the selecting circuit 43b is switched to the host function circuit 43a side and the selecting circuit 44d is switched to the device function circuit 44a side. In this case, an operation is performed in advance such that the resistor 50d in the pull-up/pull-down means 50 is connected to the data line DL2+ and the data terminal D2+, and the resistor 50e is connected to the data line DL2− and data terminal D2−.

The switching signals S42-1 and S42-2 generated from the switches 42-1 and 42-2 are input into the MC 41A. Then, the host transceiver section 43A and the device transceiver section 44A are made operable under control of the MC 41A, and the pull-down means 46 is connected to the data lines DL1+ and DL1−, and the data terminals D1+ and D1−, so that the pull-up/pull-down means 50 is switched to a pull-up mode to be connected to the data lines DL2+ and DL2−, and the data terminals D2+ and D2−. Thereby, transmission/reception of data can be performed between the host transceiver section 43A and the device 20A shown in FIG. 3B, and transmission/reception of data can be performed between the device transceiver section 44A and the host 20 shown in FIG. 3A.

(3) Host/Host Operation Using Data Terminals D1+ and D1−, and D2+ and D2− of Connector 49.

In a case that two sets of data terminals D1+ and D1−, and D2+ and D2− are used for host simultaneously, for example, two devices 20A such as shown in FIG. 3B are connected to the data terminals D1+ and D1−, and D2+ and D2− via two cables 30. In this case, two sets of power source terminals VCC and GND are provided and these terminals are connected to the power source means 48 in advance. Also, resistors 50d and 50e of the pull-up/pull-down means 50 are connected to the data lines DL2+ and DL2−, and the data terminals D2+ and D2− in advance.

The switches 42-1 and 42-2 are operated to generate switching signals S42-1 and S42-2 so that the selecting circuit 43b is switched to the host function circuit 43a side and the selecting circuit 44d is switched to the host function circuit 43a side. Source power is output from the power source means 48 according to control of the MC 41A in which the switching signals S42-1 and S42-2 have been input, and the power is supplied to the two devices 20A side via the two cables 30. Furthermore, according to control of the MC 41A, the pull-down means 46 is connected to data lines DL1+ and DL1−, and the data terminals D1+ and D1− and the pull-up/pull-down means 50 is switched to the pull-down mode to be connected to the data lines DL2+ and DL2−, and the data terminals D2+ and D2−.

The host function circuit 43a is connected to one of the devices 20A via the selecting circuit 43b, the output differential buffer 43c, the input differential buffer 43d, the data lines DL1+ and DL1−, and the data terminals D1+ and D1−, and the host function circuit 43a is further connected to the other of the devices 20A via the selecting circuit 44d, the output differential buffer 44b, the input differential buffer 44c, the data lines DL2+ and DL2−, and the data terminals D2+ and D2−. Thereby, the host where two sets of data lines D1+ and D1−, and D2+ and D2− are used simultaneously can be realized.

As mentioned above, according to the second embodiment, the following effects (a) and (b) can be obtained.

(a) Like the effect (i) of the first embodiment, using an existing USB buffer (that is, the output differential buffer 43c and the input differential buffer 44c) as it is, it becomes possible to realize one of the host function and the device function without changing electric characteristics of the USB buffer. In addition, like the effect (iv) of the first embodiment, since the data items D41a, D41b, D41d, D41e and D41f are held in the registers 45a, 45c, 45d and 45e, and the interface circuit is controlled on the basis of the signals output from these registers 45a, 45c, 45d and 45e, the burden of control on the MC 41A is reduced.

(b) Such an effect can be obtained that two sets of data terminals D1+ and D1−, and D2+ and D2− can be utilized at the time of host operation.

(Application Aspect)

Incidentally, the present invention is not limited to the above embodiments, but the present invention can employ various modifications or application aspects. As examples of these modifications or application aspects, the following (1) to (7) will be considered.

(1) The selecting circuits 43b and 44d shown in FIGS. 1 and 2 are each configured by another selecting means other than the multiplexer.

(2) A configuration may be employed such that the switches 42, 42-1 or 42-2 provided on the side of the electronic device 40 or 40A is provided on the side of the host 20 or the device 20A which is connected to the connector 49 via the cable 30, and the switching signals generated at these switches are input into the electronic device 40 or 40A, thereby performing switching between the host function and the device function.

(3) In the above embodiments, the control means has been configured with the MC 41 or 41A, but it may be configured with another control circuit. Also, the data holding means has been configured by the registers 45a to 45e, but it may be configured with another data holding circuit or it may be provided in the MC 41 or 41A.

(4) The pull-down means 46 has been configured with the tri-state inverters 46a and 46b, but it may be configured with another switching means such as other transistors or the like. Also, the pull-up means 47 has been configured with the tri-state inverter 47a, but it may be configured with anther switching means such as other transistors or the like.

(5) The pull-down/pull-up means 50 has been configured with the AND gate 52a and the tri-state inverters 50b and 50c, but it may be configured with another gate circuit or another switching means such as another transistor or the like. Also, the pull-up/pull-down means 50 is configured such that it can be switched between the pull-up and the pull-down, but it may be configured with two means of pull-up means and pull-down means.

(6) The power source means 48 or the like may be changed to another circuit configuration other than the configurations shown in Figures.

(7) The interface circuit of the present invention can be mounted on various devices or circuits other than the portable electronic device 40 or 40A.

What is claimed is:

1. An interface circuit comprising:

a data terminal for connecting a data line for USB signal transmission;

a power source terminal for connecting a power source line for source power transmission;

a switch for generating a switching signal for selecting one of a host function and a device function;

control means for controlling the entire of the interface circuit according to a program and for outputting, when the switching signal is input, one of a set of data for pull-down resistor connection and data for source power supply for performing the host function and a set of data for pull-up resistor connection and data for source power reception for performing the device function;

a host function circuit for performing transmission/reception of data for host function by control of the control means;

a device function circuit for performing transmission/reception of data for device function by control of the control means;

buffer means for performing transmission/reception of data via the data terminal;

selecting means for selecting one of the host function circuit and the device function circuit on the basis of the switching signal and connecting the selected one to the buffer means;

pull-down means for connecting a pull-down resistor to the data terminal on the basis of the data for pull-down resistor connection;

pull-up means for connecting the pull-up resistor to the data terminal on the basis of the data for pull-up resistor connection; and power supply means for performing one of an operation for supplying source power to the power supply terminal on the basis of the data for source power supply and an operation for supplying source power received from the power supply terminal to inside of the interface circuit on the basis of the data for source power reception.

2. The interface circuit according to claim 1, further comprising data holding means for holding the data for pull-up resistor connection, the data for source power supply, the data for pull-down resistor connection, and the data for source power reception by control of the control means, wherein the pull-down means connects the pull-down resistor to the data terminal on the basis of the data for pull-down resistor connection held by the data holding means; the pull-up means connects the pull-up resistor to the other of the first and second data terminals on the basis of the data for pull-up resistor connection held by the data holding means; and the power supply means performs the one of an operation for supplying source power to the power source terminal on the basis of the data for source power supply held by the data holding means and an operation for supplying source power received from the power source terminal to inside of the interface circuit on the basis of the data for source power reception held by the data holding means.

3. The interface circuit according to claim 2, wherein the data holding means comprises a register.

4. The interface circuit according to claim 1, wherein the control means comprises a micro-computer.

5. The interface circuit according to claim 1, wherein the buffer comprises an output differential buffer and an input differential buffer which are connected in parallel to the data terminal.

6. The interface circuit according to claim 1, wherein the selecting means comprises a multiplexer.

7. The interface circuit according to claim 1, wherein the pull-down means comprises switch means which is turned ON according to the data for pull-down resistor connection and a pull-down resistor.

8. The interface circuit according to claim 1, wherein the pull-up means comprises switch means which is turned ON according to the data for pull-up resistor connection and a pull-up resistor.

9. The interface circuit according to claim 1, wherein the interface circuit is a first interface circuit to which a second interface circuit is connected and the switch is disposed in one of the first interface circuit and the second interface circuit.

10. An interface circuit comprising:
a data terminal for connecting a data line for USB signal transmission;
a power source terminal for connecting a power source line for source power transmission;
a switch for generating a switching signal for selecting one of a host function and a device function;
control means for controlling the entire of the interface circuit according to a program and for outputting, when the switching signal is input, one of a set of data for pull-down resistor connection and data for source power supply for performing the host function or a set of data for pull-up resistor connection and data for source power reception for performing the device function;
a host function circuit for performing transmission/reception of data for host function by control of the control means;
a device function circuit for performing transmission/reception of data for device function by control of the control means;
first buffer means for performing transmission/reception of data between the data terminal and one of the host function circuit and the device function circuit;
second buffer means for performing transmission/reception of data between the data terminal and the other of the host function circuit and the device function circuit;
selecting means for selecting one of the host function circuit and the device function circuit on the basis of the switching signal and connecting the selected one to the first buffer means;
pull-down means for connecting a pull-down resistor to the data terminal on the basis of the data for pull-down resistor connection;

pull-up means for connecting a pull-up resistor to the data terminal on the basis of the data for pull-up resistor connection; and
power supply means for performing one of an operation for supplying source power to the power source terminal on the basis of the data for source power supply and an operation for supplying source power received from the power source terminal to inside of the interface circuit on the basis of the data for source power reception.

11. The interface circuit according to claim 10, further comprising data holding means for holding the data for pull-up resistor connection, the data for source power supply, the data for pull-down resistor connection, and the data for source power reception by control of the control means,
wherein the pull-down means connects the pull-down resistor to the data terminal on the basis of the data for pull-down resistor connection held by the data holding means; the pull-up means connects the pull-up resistor to the other of the first and second data terminals on the basis of the data for pull-up resistor connection held by the data holding means; and the power supply means performs the one of an operation for supplying source power to the power source terminal on the basis of the data for source power supply held by the data holding means and an operation for supplying source power received from the power source terminal to inside of the interface circuit on the basis of the data for source power reception held by the data holding means.

12. The interface circuit according to claim 11, wherein the data holding means comprises a register.

13. The interface circuit according to claim 10, wherein the control means comprises a micro-computer.

14. The interface circuit according to claim 10, wherein each of the first and second buffer means comprises an output differential buffer and an input differential buffer which are connected in parallel to the data terminal.

15. The interface circuit according to claim 10, wherein the selecting means comprises a multiplexer.

16. The interface circuit according to claim 10, wherein the pull-down means comprises switch means which is turned ON according to the data for pull-down resistor connection and a pull-down resistor.

17. The interface circuit according to claim 10, wherein the pull-up means comprises switch means which is turned ON according to the data for pull-up resistor connection and a pull-up resistor.

18. The interface circuit according to claim 10, wherein the interface circuit is a first interface circuit to which a second interface circuit is connected and the switch is disposed in one of the first interface circuit and the second interface circuit.

19. An interface circuit comprising:
first and second data terminals for connecting two data lines for USB signal transmission, respectively; a power source terminal for connecting a power source line for source power transmission;
a first switch which generates a first switching signal for selecting either one of a host function and a device function;
a second switch which generates a second switching signal for selecting either one of the host function and the device function;
control means for controlling the entire of the interface circuit according to a program and for outputting, when the first and second switching signal are input, one of a set of data for pull-down resistor connection and data for source power supply for performing the host function or a set of data for pull-up resistor connection and data for source power reception for performing the device function;

a host function circuit for performing transmission/reception of data for host function by control of the control means;

a device function circuit for performing transmission/reception of data for device function by control of the control means;

first buffer means for performing transmission/reception of data between the first data terminal and one of the host function circuit and the device function circuit;

second buffer means for performing transmission/reception of data between the second data terminal and the other of the host function circuit and the device function circuit;

first selecting means for selecting one of the host function circuit and the device function circuit on the basis of the first switching signal to connected the selected one to the first buffer;

second selecting means for selecting the other of the host function circuit and the device function circuit on the basis of the second switching signal to connected the selected one to the second buffer;

pull-down means for connecting a pull-down resistor to one of the first and second data terminals on the basis of the data for pull-down resistor connection;

pull-up means for connecting a pull-up resistor to the other of the first and second data terminals on the basis of the data for pull-up resistor connection; and power supply means for performing one of an operation for supplying source power to the power source terminal on the basis of the data for source power supply and an operation for supplying source power received from the power source terminal to inside of the interface circuit on the basis of the data for source power reception.

20. The interface circuit according to claim 19, further comprising data holding means for holding the data for pull-up resistor connection, the data for source power supply, the data for pull-down resistor connection, and the data for source power reception by control of the control means, wherein the pull-down means connects the pull-down resistor to the one of the first and second data terminals on the basis of the data for pull-down resistor connection held by the data holding means; the pull-up means connects the pull-up resistor to the other of the first and second data terminals on the basis of the data for pull-up resistor connection held by the data holding means; and the power supply means performs the one of an operation for supplying source power to the power source terminal on the basis of the data for source power supply held by the data holding means and an operation for supplying source power received from the power source terminal to inside of the interface circuit on the basis of the data for source power reception held by the data holding means.

21. The interface circuit according to claim 20, wherein the data holding means comprises a register.

22. The interface circuit according to claim 19, wherein the control means comprises a micro-computer.

23. The interface circuit according to claim 19, wherein each of the first and second buffer means comprises an output differential buffer and an input differential buffer which are connected in parallel to the data terminal.

24. The interface circuit according to claim 19, wherein each of the first and second selecting means comprises a multiplexer.

25. The interface circuit according to claim 19, wherein the pull-down means comprises switch means which is turned ON according to the data for pull-down resistor connection and a pull-down resistor.

26. The interface circuit according to claim 19, wherein the pull-up means comprises switch means which is turned ON according to the data for pull-up resistor connection and a pull-up resistor.

27. The interface circuit according to claim 19, wherein the interface circuit is a first interface circuit to which a second interface circuit is connected and each of the first switch and the second switch is disposed in one of the first interface circuit and the second interface circuit.

* * * * *